US006396502B1

(12) United States Patent
Cunniff (10) Patent No.: US 6,396,502 B1
(45) Date of Patent: May 28, 2002

(54) SYSTEM AND METHOD FOR IMPLEMENTING ACCUMULATION BUFFER OPERATIONS IN TEXTURE MAPPING HARDWARE

(75) Inventor: Ross Cunniff, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/419,373

(22) Filed: Oct. 15, 1999

(51) Int. Cl.[7] .............................................. G06T 11/40
(52) U.S. Cl. ........................ 345/582; 345/543; 345/561
(58) Field of Search ................................ 345/543, 545, 345/552, 561

(56) References Cited

U.S. PATENT DOCUMENTS

| | | | |
|---|---|---|---|
| 5,751,292 A | 5/1998 | Emmot ........................ 345/430 |
| 5,757,374 A | 5/1998 | Nakamura et al. ........... 345/425 |
| 5,767,858 A | 6/1998 | Kawase et al. ............... 345/430 |
| 5,835,096 A | 11/1998 | Baldwin ....................... 345/430 |
| 5,872,729 A | 2/1999 | Deolaliker ................... 364/736 |
| 5,886,706 A | 3/1999 | Alcorn et al. ................ 345/430 |
| 5,896,136 A | 4/1999 | Augustine et al. ........... 345/431 |
| 5,933,148 A | 8/1999 | Oka et al. ..................... 345/427 |
| 5,977,977 A | * 11/1999 | Kajiya et al. ................ 345/418 |
| 5,990,904 A | * 11/1999 | Griffin .......................... 345/435 |
| 6,229,553 B1 | * 5/2001 | Duluk, Jr. et al. ........... 345/506 |

* cited by examiner

*Primary Examiner*—Matthew Luu
*Assistant Examiner*—Motilewa A. Good-Johnson (57) ABSTRACT

The present invention is generally directed to a system and method for performing accumulation buffer operations using texture mapping hardware. In accordance with one aspect of the invention, a method is provided that operates by allocating a texture map of equal size as a display screen and copying contents of a frame buffer to the allocated texture map. The method then identifies an accumulation buffer operation and performs the accumulation buffer operation in a fragment unit. Preferably, the fragment unit includes an arithmetic logic unit (ALU) to perform high-speed mathematical operations. Finally, the method directs results of the accumulation buffer operation to the frame buffer, and copies contents of the frame buffer to the allocated texture map.

16 Claims, 5 Drawing Sheets

SYSTEM AND METHOD FOR IMPLEMENTING ACCUMULATION BUFFER OPERATIONS IN TEXTURE MAPPING HARDWARE

BACKGROUND OF THE INVENTION

1. Field of the Invention

The present invention relates to computer graphics systems and, more particularly to a system and method for implementing accumulation operations in hardware.

2. Discussion of the Related Art

Computer graphics systems commonly are used for displaying graphical representations of objects on a two dimensional display screen. Current computer graphics systems can provide highly detailed representations and are used in a variety of applications.

In typical computer graphics systems, an object to be represented on the display screen is broken down into a plurality of graphics primitives. Primitives are basic components of a graphics picture and may include points, lines, vectors and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B color values of each vertex. Rendering hardware interpolates the primitive data to compute the display screen pixels that are turned on to represent each primitive, and the R,G,B values for each pixel.

Early graphics systems failed to display images in a sufficiently realistic manner to represent or model complex three-dimensional objects. The images displayed by such systems sometimes exhibited extremely smooth surfaces absent textures, bumps, scratches, shadows and other surface details present in the object being modeled. In addition, early graphics systems often suffered from poor image quality, due to phenomenon such as aliasing.

As is known, accumulation buffers have been used in graphical image processing to accomplish a number of effects, including anti-aliasing, motion blur, enhanced depth perception, and soft shading. In general, an accumulation buffer is used to combine multiple frames to produce a composite frame. Each of the multiple frames is typically combined with the accumulation buffer by calculating, for each pixel of the frame, a weighted average of the pixel with a corresponding pixel of the accumulation buffer. Each of the above-listed effects are achieved by altering a single graphical image slightly to produce a number of slightly different frames and accumulating the frames in the accumulation buffer.

To more particularly illustrate the foregoing, aliasing refers to jagged edges on graphical objects represented in a rasterized image. For example, a line which is slanted, i.e., neither fully horizontal nor fully vertical, appears to be jagged when displayed in a rectangular grid of pixels of a computer display device. The jagged quality is a result of rounding floating point values to integer pixel addresses. Anti-aliasing generally refers to graphical alteration of a graphical object or image to remove the appearance of jagged edges. An accumulation buffer is used to produce an anti-aliased image by "jittering" the image. In other words, the graphical image is rendered into the accumulation buffer. Then the graphical image is translated (i.e., moved) by a fraction of a pixel and is rendered again to produce a slightly translated frame. Rendering the graphical image as translated causes the jags in the various edges of the various graphical objects rendered to appear in slightly different places. The slightly translated frame is then accumulated with the previously rendered frame in the accumulation buffer and the resulting frame is stored in the accumulation buffer. The translation, rendering and accumulation of frames of the graphical image is repeated a number of times. The result is an averaging of a number of frames in which jags in the edges of graphical objects in a graphical image are smoothed, providing the appearance of smooth edges.

An accumulation buffer may also be used in a similar fashion to blur graphical objects in motion. In computer generated animation, objects in motion often have no blur, i.e., appear to have very sharp edges. When an object with sharp edges moves quickly across a television or movie screen or across a computer display device in a motion video display, the appearance is very unnatural and disturbing to the viewer. To achieve a more natural blurring of the object in motion, a graphical image in which an object is in motion is repeatedly rendered with the object in different position along the path of motion of the object and the resulting frames are accumulated in the accumulation buffer. The resulting accumulated frame includes an image of the moving graphical object which is blurred along the path of motion of the graphical object and a considerably more natural and pleasing animated video display.

An accumulation buffer may also be used to enhance depth perception in a three-dimensional graphical image. Depth perception is enhanced by blurring graphical objects distant from the viewer while preserving sharpness in graphical objects nearer the viewer. This result is achieved by repeatedly rendering the three-dimensional image from slightly varying perspectives. Altering the perspective of a three-dimensional graphical image results in greater movement of graphical object further from the viewer relative to movement of objects nearer the viewer. Accumulation of frames corresponding to slightly varied perspectives therefore results in blurring of graphical objects substantially proportional to the distance of the graphical objects from the viewer. Thus, depth perception in the rendered and accumulated graphical image is enhanced substantially.

An accumulation buffer may further be used to soften shadows in a rendered graphical image. Because of the precision of computers in rendering three-dimensional graphical images, shadows portrayed in such rendered graphical images are particularly sharp, resulting in an unnatural, surreal appearance of the graphical image. Shadows in such a graphical image are softened by repeatedly rendering the graphical image with the respective positions of various virtual light sources, which define the lighting characteristics of the graphical image, varied slightly and the resulting frames are accumulated in the accumulation buffer. Since each frame corresponds to a slightly different light source position, shadows in each frame are in a slightly different position. The accumulated frame in the accumulation buffer therefore has softer shadows, as if from a more diffused light source. The resulting displayed graphical image is more natural and realistic.

The OpenGL specification includes an accumulation buffer, which is a per-pixel screen resource, which allows applications to periodically accumulate partially rendered scenes, and then, when the full scene has rendered, put the final result back into the frame buffer. As previously mentioned, applications for the accumulation buffer include full scene antialiasing, motion blur, enhanced depth perception, and soft shading.

As is known, some of the operations which may be performed by the accumulation buffer are: Clear, Load, Accumulate, Multiply, Add, and Return. The Clear operation clears the entire contents of the accumulation buffer to a specified color (typically black). The Load operation copies the contents of the frame buffer into the accumulation buffer. The Accumulate operation multiplies the contents of the frame buffer (on a per-pixel basis) by a supplied number and adds the results to the contents of the accumulation buffer. The Multiply operation multiplies the contents of the accumulation buffer by a supplied number. The Add operation adds a supplied number to each component of the accumulation buffer. Finally, the Return operation multiplies the contents of the accumulation buffer by a supplied number and returns the number to the frame buffer.

Typically, the accumulation buffer operations listed above are implemented in software. As should be appreciated, particularly for high resolution applications, the foregoing operations require the execution of a large number of instructions. Therefore, implementing these operations in software is relatively time consuming. However, adding dedicated hardware to an existing system to accelerate the execution of these operations is costly.

Accordingly, it is desired to provide a system and method that provide improved performance in the execution of accumulation buffer operations, particularly in an OpenGL compliant system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for performing accumulation buffer operations using texture mapping hardware. In accordance with one aspect of the invention, a method is provided that operates by allocating a texture map of equal size as a display screen and copying contents of a frame buffer to the allocated texture map. The method then identifies an accumulation buffer operation and performs the accumulation buffer operation in a fragment unit. Preferably, the fragment unit includes an arithmetic logic unit (ALU) to perform high-speed mathematical operations. Finally, the method directs results of the accumulation buffer operation to the frame buffer, and copies contents of the frame buffer to the allocated texture map.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It should be appreciated from the summary presented above, that one aspect of the present invention relates to the utilization of high-speed texture mapping graphics hardware to implement certain operations of an accumulation buffer. Utilizing texture mapping hardware in this fashion allows certain operations, otherwise performed in the accumulation buffer, to be performed much faster. In this respect, it was discovered that certain accumulation operations are performed much like a blend operation performed in texture mapping hardware. Texture mapping and blending are well known in the art, and need not be described herein, in order to gain an understanding of the present invention. Nevertheless, for completeness, certain basic aspects of texture mapping and blending will be described herein.

Texture Mapping

Texture mapping is a term that refers to a method for displaying images with improved surface detail. Texture mapping involves mapping a source image, referred to as a texture, onto a surface of a three-dimensional object, and thereafter mapping the textured three-dimensional object to the two-dimensional graphics display screen to display the resulting image. Surface detail attributes commonly texture mapped include color, specular reflection, vector perturbation, specularity, transparency, shadows, surface irregularities and grading.

Texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to it are accessed from the texture map, and incorporated into the final R,G,B values generated for the pixel to represent the textured object on the display screen.

It should be understood that each pixel in an object primitive may not map in one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels is used to represent the object on the display screen, and each pixel that represents the object may map in one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. Each pixel may also map to multiple texels when a texture is mapped to a small portion of an object. Resultant texel data is calculated for each pixel that maps to more than one texel, and typically represents an average of the texels that map to that pixel.

Texture mapping hardware is well known for performing texture mapping operations at very high speed. One such operation performed by texture mapping hardware is a blend operation.

Blending

Blending is a technique that combines the R, G, B color values of a pixel (the "source" pixel) being processed with the R, G, B color values of a corresponding pixel (the "destination" pixel), previously computed and stored for example in a buffer (such as a frame buffer). The source pixel and the destination pixel have the same x, y screen coordinates. An alpha ($\alpha$) value, associated with the source pixel, controls how much of the destination pixel color values should be combined with those of the source pixel.

Without blending, the color values of the source pixel overwrite the existing color values of the destination pixel, as though the source pixel is opaque. With blending, a user may control, to a limited degree of resolution, how much of the existing destination pixel color value should be combined with that of a source pixel. Thus, blending is used to create a translucent image, one that enables a portion of a previously stored color value "show through" a source color value. Color blending lies at the heart of techniques such as transparency, digital compositing, and painting.

One way to understand blending operations is to consider the R, G, B values of a source pixel as representing its color, and the alpha .alpha. value as representing its transparency (or opacity). Levels of transparency range from completely transparent to somewhat transparent (translucent) to opaque. In standard computer graphics systems that employ blending, $\alpha$ is a digital word of a certain number of bits that has a value between 0 and 1. If $\alpha=0$, then the pixel is transparent. If $\alpha=1$, then the pixel is opaque. If $\alpha$ has some value between 0 and 1, then the pixel is translucent.

Blending can be understood with reference to the following analogous example. If one is viewing a destination object through colored glass, then the color seen is partly the color of the glass and partly the color of the object. The percentage of one color seen versus the other, varies depending on the transmission properties of the glass. If the glass transmits 80% of the light that strikes it, for example, then the glass has a transparency of 80% (an opacity of 20%), and the color seen is a combination of 20% glass color and 80% object color. Objects also can be viewed through multiple translucent (or transparent) surfaces such as multiple pieces of glass. Similarly, computer graphics blending operations can be performed with multiple source images. During blending, color values of source pixels are combined with color values of corresponding destination pixels (on a pixel-by-pixel basis) in a two-stage process. The color values typically are combined by blending hardware in computer graphics systems. The source $R_s$ and destination $R_d$ values are combined separately from the source $G_s$ and destination $G_d$ values, which are combined separately from the source $B_s$, and destination $B_d$ values. Each of the values is combined using digital arithmetic hardware according to standard blending equations that involve the color values and the source $\alpha$ value. Such blending equations are standard in the industry and are listed in the OpenGL Programming Guide The Official Guide to Learning OpenGL, Release, by Neider, Davis and Woo (OpenGL Architecture Review Board), Addison-Wesley Publishing Company, Second Printing, August 1994, which reference herein is incorporated by reference in its entirety.

Implementing Accumulation Operations in Texture Mapping Hardware

As previously mentioned, one aspect of the present invention relates to the implementation of certain accumulation operations in texture mapping hardware. The preferred embodiment of the invention is compatible in all OpenGL-compliant systems. The "OpenGL" standard is a very important software standard for graphics applications. In any computer system that supports this standard, the operating system(s) and application software programs can make calls according to the OpenGL standards, without knowing exactly what the hardware configuration of the system is.

The OpenGL standard provides a complete library of low-level graphics manipulation commands, which can be used to implement three-dimensional graphics operations. This standard was originally based on the proprietary standards of Silicon Graphics, Inc., but was later transformed into an open standard. It is now becoming extremely important, not only in high-end graphics-intensive workstations, but also in high-end PCs. OpenGL is supported by Windows NT, which makes it accessible to many PC applications.

The OpenGL specification provides some constraints on the sequence of operations. For instance, the color DDA (digital differential analyzer) operations must be performed before the texturing operations, which must be performed before the alpha operations. A DDA is a conventional piece of hardware used to produce linear gradation of color (or other) values over an image area.

In one embodiment, the invention may be implemented through the use of standard OpenGL commands. In another embodiment, the invention may be implemented as a device driver, and operates by identifying certain OpenGL commands that would ordinarily result in the performance of operations in the accumulation buffer, and instead performs those operations in the higher performance texture mapping hardware.

Figure 1:
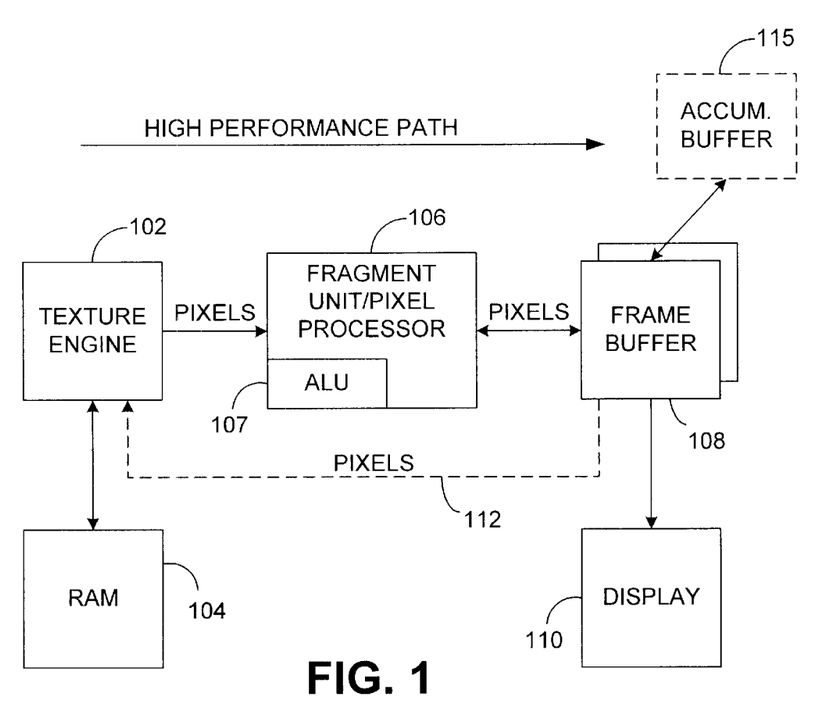
FIG. 1 is a block diagram illustrating the principal hardware components of a system constructed in accordance with the invention.

To better appreciate these implementations, reference is now made to FIG. 1, which is a block diagram illustrating certain components in a computer graphics system. Specifically, the principal components illustrated in FIG. 1 include a texture engine 102, RAM 104, a fragment unit (or pixel processor) 106 the frame buffer 108 and a display 110. The RAM 104 includes texture maps, which may be exchanged with the texture engine 102 during texture processing, The fragment unit 106 is also utilized (in communication with the texture engine 102) during texture processing. Typically, an arithmetic logic unit (ALU) 107 is incorporated into the fragment unit 106, and a utilized to execute various mathematical operations. For example, the ALU 107 may be utilized when performing accumulation and blending functions.

As is known, and defined in the OpenGL standard, various texture and blend operations may be performed and are supported by the OpenGL standard instruction set. Blending is enabled or disabled simply by using the commands "Enable Blend" and "Disable Blend." In this regard, OpenGL includes blending instructions that utilize the texture mapping hardware to perform functions such as blend operations. For example, OpenGL specifies the following blend instructions, which may be utilized by the present invention: "glBlendEquation(GL_FUNC_ADD)" and "glBlendFunc(GL_SRC_ALPHA, GL_ONE_MINUS_SRC_ALPHA)". OpenGL specifies other blend instructions, but these are the most pertinent to the preferred embodiment of the invention.

The glBlendEquation(GL_FUNC_ADD) instruction defines the blending equation as C=CsS+CdD, where Cs and Cd are the source and destination colors, and S and D are quadruplets of weighting factors, as specified by glBlendFunc. The instruction glBlendFunc( ) src specifies how to compute a source blending factor, while glBlendFunc( ) dst specifies how to compute a destination blending factor.

As is known, the path of data processing from the texture unit 102 through the fragment unit 106 to the frame buffer 108 is the direction of high-speed or high-performance processing. A reverse path 112, however, is provided within the texture mapping hardware, and is supported by the OpenGL instruction set. Specifically, OpenGL specifies a "glCopyTexSubImage2D( )" instruction, which copies pixels from the frame buffer 108 into a portion of the current texture.

Therefore, and in accordance with one aspect of the invention, OpenGL instructions may be coded to specifically utilize the texture mapping hardware to perform certain accumulation functions. For example, rather than use the standard glAccumulate instruction to multiply the contents of the frame buffer by a number and add that result to the contents of the accumulation buffer, one could code OpenGL instructions to copy contents of the frame buffer 108 to the texture engine 102, along path 112 (using the "glCopyTexSubImage2D( ) instruction). Then, one could code OpenGL blending instructions to perform the multiply and accumulation operations using the high-speed ALU 107 in the pixel processor 106, and write the resulting pixels to the frame buffer 108. It should be understood that utilizing the texture mapping hardware in this novel manner greatly accelerates the processing of certain operations normally performed by the accumulation buffer.

An accumulation buffer 115 is also illustrated in FIG. 1 in dashed line. This accumulation buffer 115 has been illustrated merely for the purpose depicting the contrasting data-flow of the present invention. For example, the accumulation buffer 115, as a feature of OpenGL, in the past has been generally implemented in software, and data is exchanged between the frame buffer 108 and the accumulation buffer 115 in a relatively low-performance fashion. Instead, and in accordance with the present invention, data from the frame buffer 108 is transferred to the texture engine. Thereafter, blend operations are performed on the data and it is written back into the frame buffer 108.

Figure 2:
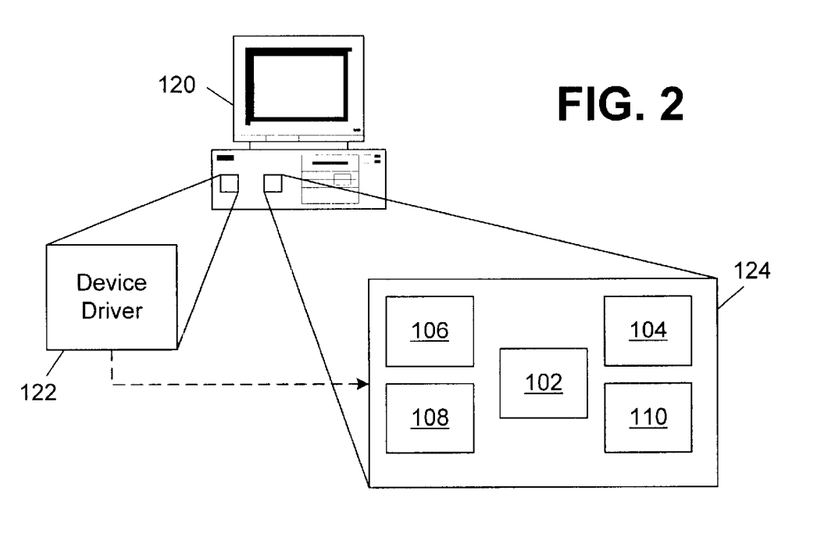
FIG. 2 is a block diagram of a computer having graphics hardware and a device driver that cooperate to carry out the enhanced graphic accumulation operations of the present invention.

Preferably, the present invention is implemented as a device driver. In such an implementation, texture mapping hardware is utilized in certain accumulation operations, without being specifically coded in the OpenGL code. Rather, a device driver implementing the inventive features recognizes certain instructions that would normally invoke the accumulation buffer, and instead control the execution of these instructions though C (or other coded) functions. Reference is made briefly to FIG. 2, which depicts a computer 120 having internal graphics hardware 124, including a texture engine 102, a fragment unit 106, a RAM 104, and a frame buffer 108. A device driver 122 is also illustrated. As is known, a device driver may be implemented in programmed code. The dashed line pointing from the device driver 122 to the graphics hardware 124 is provided to illustrate the notion that the device driver 122 controls at least some operations of the graphics hardware. To better illustrate the function and operation of the preferred embodiment of the present invention, reference is made to the flowcharts of FIGS. 3, 4A, and 4B, which collectively depict the top-level operation of a system constructed in accordance with the present invention.

Figure 3:
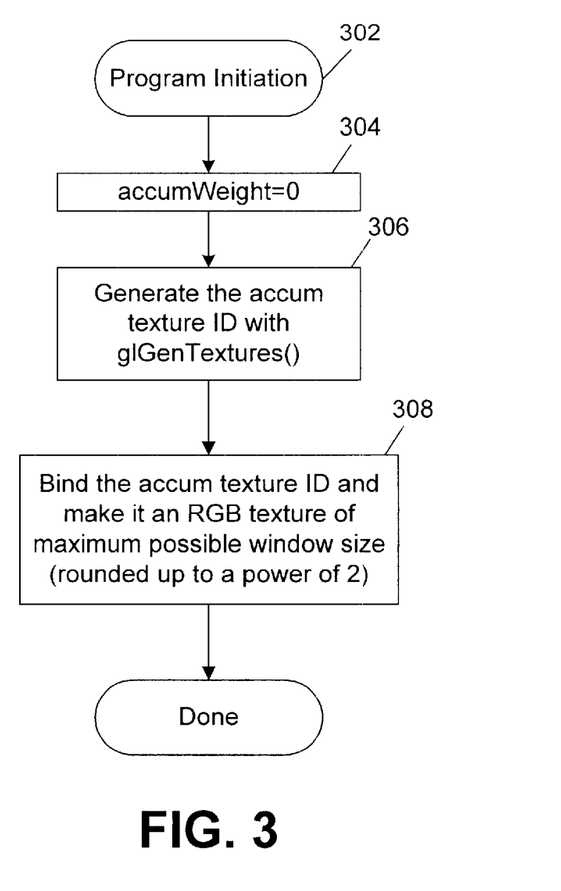
FIG. 3 is a flow chart illustrating the top-level operation of the initialization associated with a system constructed in accordance with the invention.

Referring first to FIG. 3, a flow chart depicts certain initiation routines performed by the present invention. In this regard, upon power-up or program initiation, certain initialization routines may be performed, and are broadly denoted by step 302. Thereafter, a variable called "accumWeight" is initialized to a value of 0 (step 304). The significance and operation of this variable will be discussed below. Then, step 306 generates the accumulation texture ID. As is known in texture mapping, a plurality of different texture maps may be created and assigned unique texture ID numbers for later reference. Step 306 creates a texture ID that is uniquely assigned to the accumulation buffer. This ID may be generated using the OpenGL instruction "glGenTextures( )". Finally at step 308, the accumulation texture is bound and made into an RGB texture of maximum possible window size (rounded up to the next power of 2). That is, if the screen size of the display is 800×600 pixels, then the texture will be sized as a 1,024×1,024 texture map. This step may be performed by using the OpenGL instruction "glBindTexture( )."

Figure 4A:
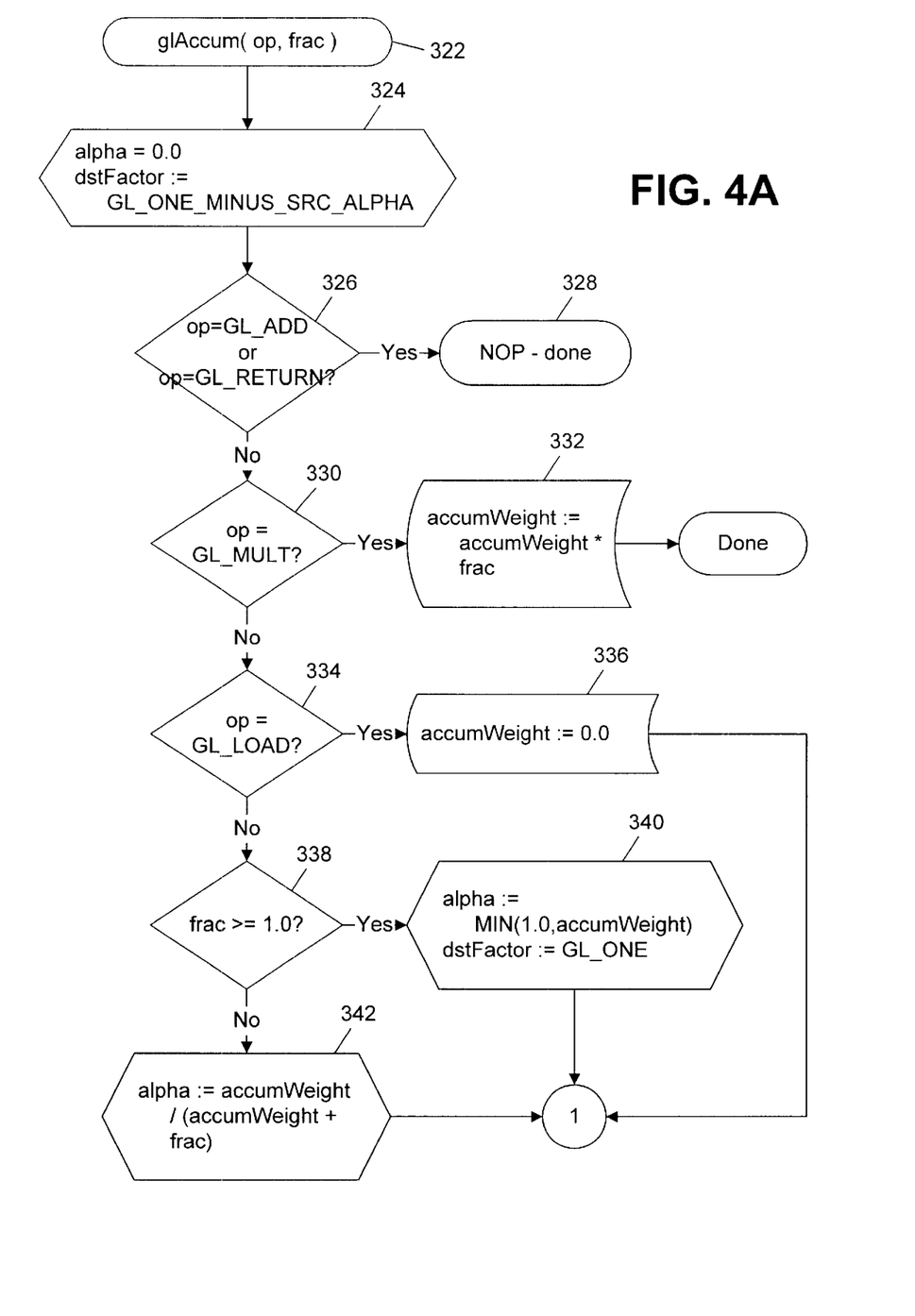
FIGS. 4A and 4B collectively comprise a flow-chart illustrating the top-level functional operation of a method constructed in accordance with the invention.
Figure 4B:
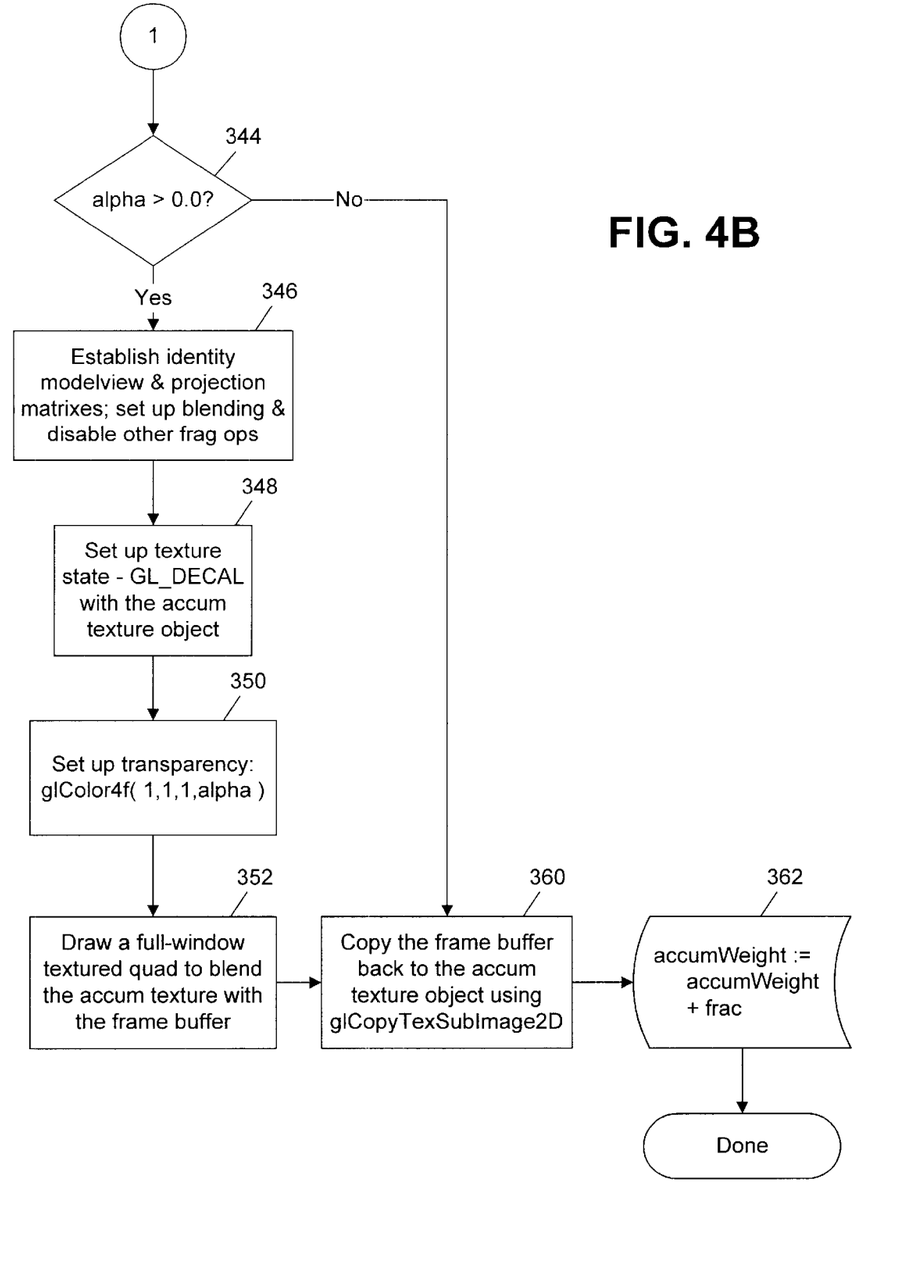

Reference is now made collectively to FIGS. 4A and 4B, which comprise a flow chart illustrating the top-level functional operation of the present invention. As summarized above, the present invention operates to implement certain accumulation buffer operations within the texture mapping hardware. The genesis of the present invention was the recognition that certain accumulation buffer operations were implemented using multiplication and addition operations that closely resemble the blend operation performed in texture mapping hardware. For example, the accumulate instruction of OpenGL multiplies the contents of the frame buffer by a number supplied by the programmer and adds that resulting value to the contents of the accumulation buffer (on a per-pixel basis). Once this accumulate instruction was implemented in the texture mapping hardware, it was discovered that certain other accumulation buffer operations could be conveniently and efficiently performed using the texture mapping hardware as well. These instructions included the following instructions: "gl_Clear", "gl_Add", "gl_Return", "gl_Multiply", "gl_Load", and "gl_Accumulate". As previously mentioned, OpenGL could be coded to specifically implement these instructions using texture mapping hardware. Alternatively, a device driver may be written that recognizes these instructions and controls their execution so that they are carried out in texture mapping hardware. It should be appreciated that the execution of these instructions has been presented merely for purposes of illustration and variants of this method may be implemented consistent with the scope and spirit of the present invention.

Step 322 represents an entry point into the method of the present invention by a call or invocation of an OpenGL instruction that implements an accumulation buffer is operation in texture mapping hardware. Once one of these instructions has been identified, it may be passed to a routine called "glAccum", which receives the variables "op" and "frac". The "op" variable denotes the operation (e.g., gl__Add, gl__Accumulate, etc.) that is passed to the glAccum routine. frac is a variable that indicates how much accumulation has occurred. Again, this value may be controlled by a programmer, and an example will be presented below to better illustrate the use and purpose of this value. In step 324, alpha (the transparency value) is set to 0 and the destination pixel value is set to 1-alpha (the alpha value of the source pixel). Step 326 is a decisional block, which determines whether the variable op is either gl__Add or gl__Return. If so, no operation needs to be performed (step 328).

Decision block 330 determines whether the variable op is gl__Multiply. If so, the factor accumWeight is set equal to the product of accumWeight and the frac variable (step 332). The variable accumWeight is a floating point scale factor that will be further illustrated in connection with the frac variable in the example that will be presented below. Decision block 334 determines whether the op variable is gl__Load. If so, the accumweight variable is set to 0 and the method proceeds to step 344 (the operation of step 344 and the ensuing steps will be discussed below). If decision blocks 326, 330, and 334 have all resolved to NO, then it is assumed that the variable op is gl__Accumulate, and decision block 338 determines whether the variable frac exceeds the value of 1 (generally the variable frac will be a value less than 1). If, however, the value exceeds 1, step 340 sets the alpha value equal to the lesser of 1 or the value of the accumWeight variable. It also sets the destination factor equal to 1. Since alpha is defined as a value from 0.0 to 1.0, step 340 ensures that the value used is appropriately clamped to that range.

If step 338 resolves to NO, then the alpha value is set equal to the accumWeight variable divided by the sum of the accumWeight variable the frac variable. The method then proceeds to step 344, where it determines whether alpha is greater than 0. If the alpha value is not greater than 0 (i.e., alpha equals 0) there is complete transparency, and no blending operations need to be performed. Therefore, the method may proceed to step 350, where contents of the frame buffer are copied back to the accumulation texture object contained within the texture engine. This step is preferably executed using the "glCopyTexSubimage2D( )" instruction. Thereafter the accumWeight variable is increased by an amount equal to the frac variable (step 362).

If, however, step 344 determines that the alpha value is greater than 0, then the method establishes identity modelview and projection matrices, and sets up blending within the texture hardware (step 346). It then sets up a texture state (gl__Decal) with the accumulation texture object (step 348). The method then sets up a transparency value using "glColor4f" with each R, G, and B value set to 1, and using the current alpha value (step 350). The method then draws a full-window textured quad to blend the texture ID associated with the accumulation buffer with the frame buffer. Thereafter, the method proceeds to step 360, and continues operation from there in the manner described above.

Having described the flow charts of FIGS. 4A and 4B, consider an example of a multi-pass accumulation rendering. Assume, for example, that a programmer configures code to perform a four-pass accumulation (again, the purpose of the accumulation could be any of a variety). Further assume that the programmer sets the frac variable equal to 0.25. The values set out in Table 1 below show the values of the accumWeight variable before the pass, after the pass, and the value of alpha.

TABLE 1

| Pass | AccumWeight (before) | AccumWeight (after) | Alpha |
|---|---|---|---|
| 1 | 0.0 | 0.25 | 0.0 |
| 2 | 0.25 | 0.5 | 0.5 |
| 3 | 0.5 | 0.75 | 0.6667 |
| 4 | 0.75 | 1.00 | 0.75 |

As can be readily verified, in an "equal weight" accumulation algorithm (like most antialiasing or motion blur algorithms), the alpha value increases in an useful way each time. The first time through, alpha is zero, because of the need to accumulate entirely the frame buffer pixels. The second pass through, the frame buffer and the accumulation buffer are equally weighted (since both buffers have a 1 pass in them). As a result, the alpha value is 1/2, or 0.5 (alpha=accumWeight/(accumWeight+frac or alpha=0.5/0.25+0.25=0.5). The accumulation pixels begin having higher weight on the third pass through, since the accumulation buffer now has 2 passes in it, while the frame buffer still only has the current pass in it. After the third pass, alpha is 0.6667. This progresses exactly the same way when frac is equal to 1/numPasses, no matter how large numPasses gets.

Figure 5:
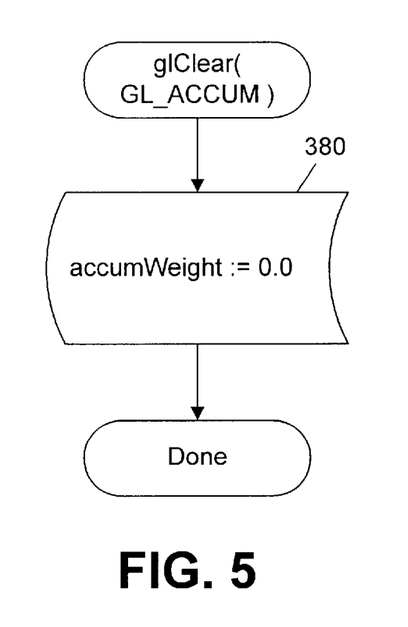
FIG. 5 is a flow chart that illustrates the top-level operation of a clear operation.

Reference is made briefly to FIG. 5, which is a flow chart illustrating the top-level operation of a gl__Clear instruction. As is known, the gl__Clear instruction operates to clear the contents of the accumulation buffer, or to write a constant value to all pixel locations of the accumulation buffer. In the implementation of the present invention, this instruction may be carried out simply by setting the accumWeight variable to a value of zero (step 380). As a result, the gl__Clear instruction is executed extremely rapidly (as opposed to writing a constant value to each of the memory locations of the accumulation buffer).

Having described the preferred embodiment of the present invention, it should be appreciated that there are various alternative embodiments that may be implemented, consistent with the scope and spirit of the present invention. Indeed, various alternative configurations may be implemented to achieve certain performance advantages. In this regard, reference is made to FIG. 6, which is a diagram similar to FIG. 1, but further illustrates two additional "flags" 420 and 422. A first flag 420, labeled as "Return Needed Flag" may be provided to indicate whether a "gl__Return" instruction is needed. As is known, the gl__Return instruction operates to transfer the contents from the OpenGL accumulation buffer back to the frame buffer. However, since the accumulated result of the present invention is already in the frame buffer 108 at the end of an accumulation operation, the gl__Return instruction need not be executed. Stated, another way, the gl__Return operation need only be carried out if the contents of the frame buffer 108 are overwritten. Therefore, the value of this flag 420 may generally be set to FALSE. Thus, and the end of most interim accumulation operations, the contents of the frame buffer 108 will be copied back to the texture engine 102, to prepare for the next pass, or next accumulation. The flag 420 may be set to TRUE, however, if any command is subsequently executed that modifies the contents of the frame buffer 108. In response to a gl__Return operation, a return is needed only if the Return Needed flag is TRUE.

Figure 6:
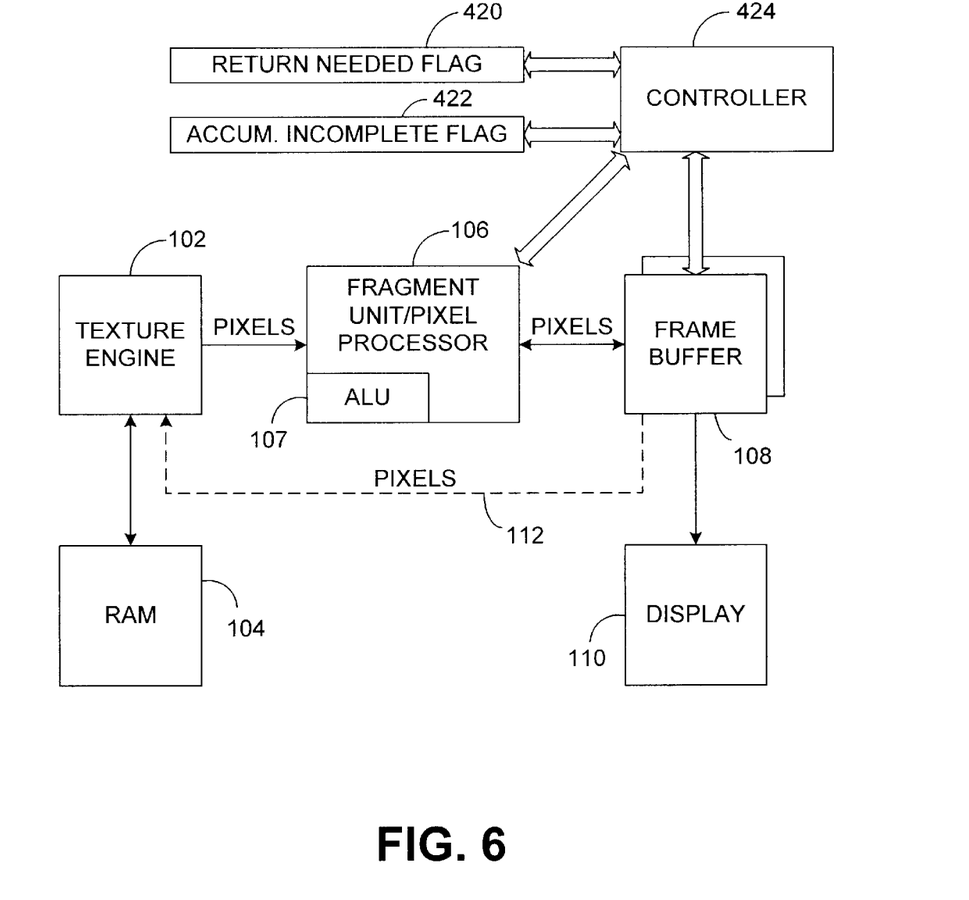
FIG. 6 is a diagram similar to FIG. 1, but illustrating certain flags that may be utilized to gain performance enhancements.

A second flag 422, labeled as "Accum. Incomplete Flag" is provided to indicate a status of the current, ongoing accumulation operation. This flag may be utilized to avoid the final copy-back of the contents of the frame buffer 108 to the texture engine 102, after the final accumulation operation. As described above, the glCopyTexSubimage2D( ) instruction is used to copy the contents of the frame buffer 108 back to the texture engine after each interim accumulation instruction. When a multi-pass accumulation operation is set up by a programmer/user, this flag 422 may be set to TRUE. After each interim accumulation operation, the contents of the frame buffer 108 are copied back to the texture engine 102, so long as the value of this flag is TRUE. When, however, the final pass of a multi-pass accumulation is initiated, this flag may be set to FALSE, and the final copy-back (e.g., glCopyTexSubimage2D( ) instruction) need not be performed.

As illustrated, additional control circuitry 424 may be provided to achieve carryout these features, in connection with the status of the flags 420 and 422.

Having described the method of the present invention, it will be appreciated that the steps illustrated in the flow charts of FIGS. 3, 4A, 4B, and 5 are provided for purposes of illustration and is not deemed to be limiting on the broader aspects of the present invention. Indeed, the broader aspects of the present invention may be implemented using a variety of different approaches that are still consistent with the scope and content of the present invention. In this regard, it should be appreciated that the flow charts of FIGS. 3, 4A, 4B, and 5 show the top-level operation of only one possible implementation of the methods of the present invention. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3A and 3B. For example, two blocks shown in succession may in fact be executed substantially concurrently or the blocks may sometimes be executed in the reverse order, depending upon the functionality involved.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for performing an accumulation buffer operation using texture mapping hardware comprising the steps of:
   allocating a texture map of equal size as a display screen;
   copying contents of a frame buffer to the allocated texture map;
   identifying an accumulation buffer operation;
   performing the accumulation buffer operation in a fragment unit, the fragment unit having an arithmetic logic unit (ALU);
   directing results of the accumulation buffer operation to the frame buffer; and
   copying contents of the frame buffer to the allocated texture map.

2. The method as defined in claim 1, wherein the step of allocating a texture map includes generating an accumulation texture ID.

3. The method as defined in claim 2, wherein the step of generating an accumulation texture ID is performed by using a program call of glGenTextures( ).

4. The method as defined in claim 2, wherein the step of allocating a texture map includes the steps of binding the accumulation texture ID and making it an RGB texture of maximum possible window size, rounded up to a power of 2.

5. The method as defined in claim 4, wherein the step of binding the accumulation texture ID is performed by using a program call of glBindTexture( ).

6. The method as defined in claim 1, wherein the step of copying contents of a frame buffer to the allocated texture map is performed by using a program call of glCopyTexSubImage2D( ).

7. The method as defined in claim 1, wherein the step of identifying an accumulation buffer operation includes identifying an accumulate operation.

8. The method as defined in claim 7, wherein the step of performing the accumulation buffer operation in a fragment unit includes determining whether a transparency value is greater than zero.

9. The method as defined in claim 8, further including the steps of establishing identity modelview and projection matrices, and setting up blending.

10. The method as defined in claim 8, further including the step of setting up a texture state with an accumulation texture object.

11. The method as defined in claim 10, wherein the step of setting up the texture state is performed by using a program call of GL_DECAL.

12. The method as defined in claim 8, further including the step of setting up transparency using a program call of glColor4f(1, 1, 1, alpha), where alpha is the transparency value.

13. A computer readable medium for controlling the operation of a computer graphics system to perform an accumulation buffer operation using texture mapping hardware comprising:
   a code segment configured to allocate a texture map of equal size as a display screen;
   a code segment configured to copy contents of a frame buffer to the allocated texture map;
   a code segment configured to identify an accumulation buffer operation;
   a code segment configured to perform the accumulation buffer operation in a fragment unit, the fragment unit having an arithmetic logic unit (ALU);
   a code segment configured to direct results of the accumulation buffer operation to the frame buffer; and
   a code segment configured to copy contents of the frame buffer to the allocated texture map.

14. A computer system configured to execute the code segments contained on the computer readable medium as defined in claim 13.

15. The computer readable medium as defined in claim 13, the code segment configured to allocate a texture map is further configured to generate an accumulation texture ID.

16. The computer readable medium as defined in claim 15, wherein the code segment configured to allocate a texture map is further configured to bind the accumulation texture ID and make it an RGB texture of maximum possible window size, rounded up to a power of 2.

* * * * *